Nov. 10, 1942.    O. E. HILL    2,301,279
CAR SEAT REVERSING MECHANISM WITH GEAR
Filed Oct. 8, 1940    5 Sheets-Sheet 1
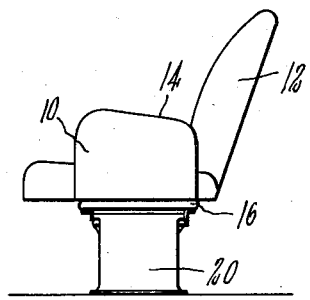
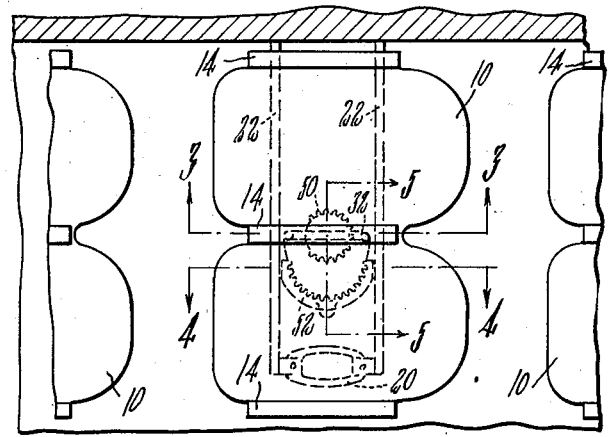
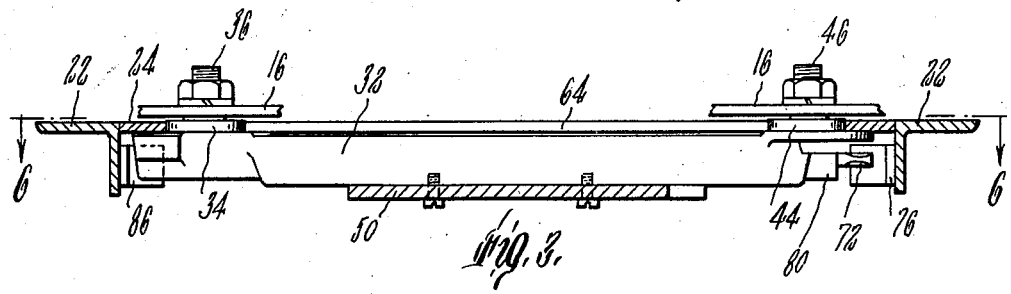
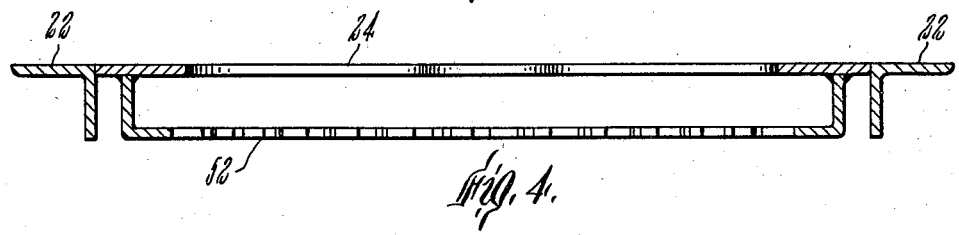
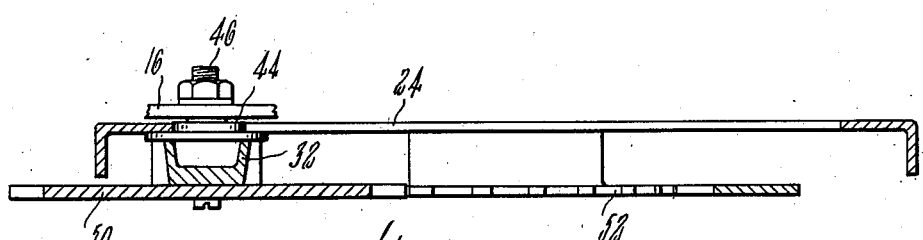
Inventor
Orea E. Hill
by Wright, Brown, Quinby & May
Attys.

Nov. 10, 1942.    O. E. HILL    2,301,279
CAR SEAT REVERSING MECHANISM WITH GEAR
Filed Oct. 8, 1940    5 Sheets-Sheet 2

Inventor
Oiva E. Hill
By Wright, Brown, Quinby May
Attys.

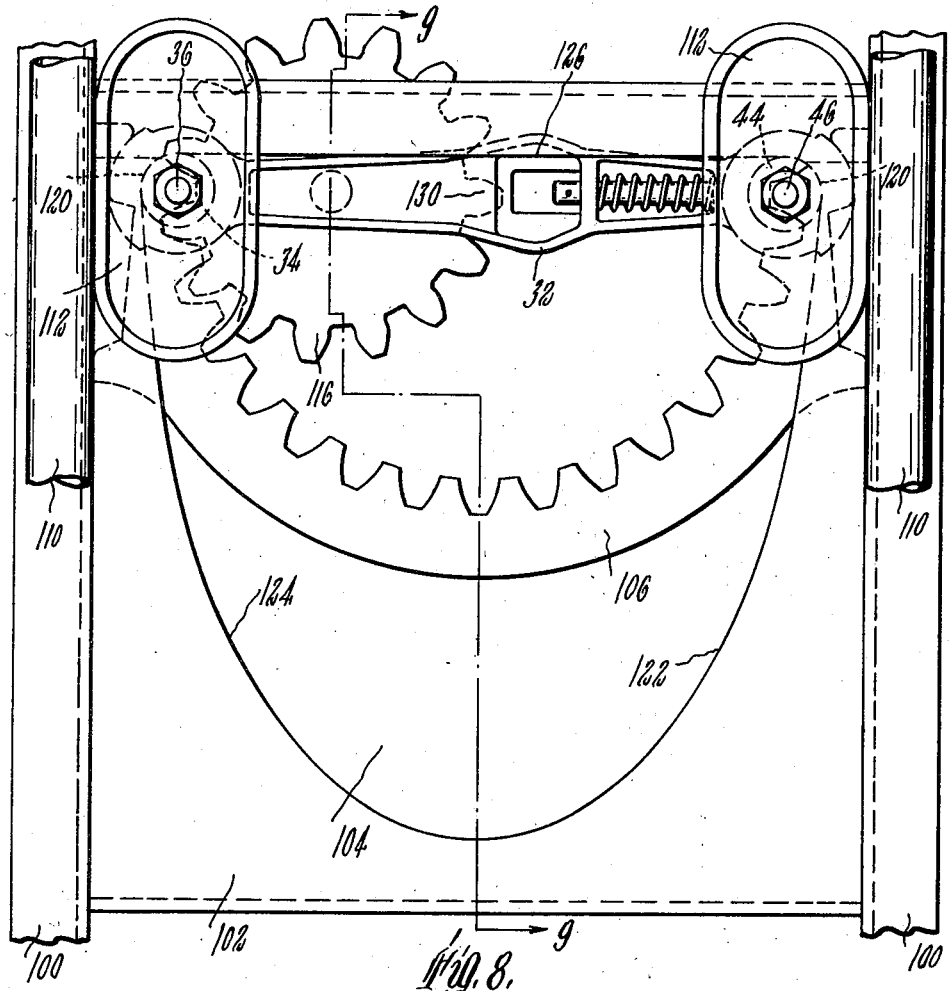
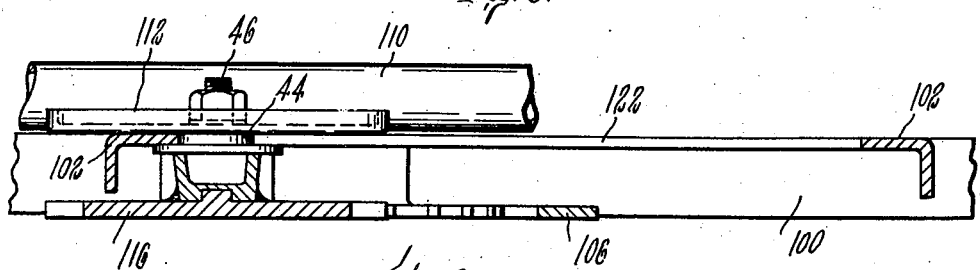

Nov. 10, 1942.  O. E. HILL  2,301,279

CAR SEAT REVERSING MECHANISM WITH GEAR

Filed Oct. 8, 1940   5 Sheets-Sheet 4

Inventor
Oiva E. Hill
by Wright, Brown, Quinby + May
Attys.

Nov. 10, 1942.   O. E. HILL   2,301,279
CAR SEAT REVERSING MECHANISM WITH GEAR
Filed Oct. 8, 1940   5 Sheets-Sheet 5

Inventor
Oliva E. Hill
by Wright, Brown, Quinby May
Attys.

Patented Nov. 10, 1942

2,301,279

UNITED STATES PATENT OFFICE 2,301,279

CAR SEAT REVERSING MECHANISM WITH GEAR

Oiva E. Hill, Gardner, Mass., assignor to Heywood-Wakefield Company, Gardner, Mass., a corporation of Massachusetts Application October 8, 1940, Serial No. 360,253

5 Claims. (Cl. 155—96)

This invention relates to reversible car-seat base mechanisms by which car seats may be swung around a vertical pivot, and more particularly to mechanisms by which the seat is horizontally shifted during its turning movement for the purpose of permitting the seat to occupy positions close to the adjacent wall of the vehicle when in use without preventing the rotation of the seat from one position to another.

The invention represents improvements on the mechanism described and claimed in my copending application Ser. No. 285,711, filed July 21, 1939, pursuant to which Letters Patent No. 2,240,620 were granted May 6, 1941.

It is an object of the present invention to provide reversing mechanisms which are more readily and economically manufactured than previous mechanisms designed for similar purposes, and which smooth the motion of the car seat on its reversing movement, with less tendency to stick or bind at certain stages of the reversing movement.

The car-seat base mechanisms herein shown and described are of the type having cam surfaces and cam followers which are effective during a reversing movement to shift the seat horizontally so that its center follows a predetermined path. In general, in mechanisms of this type, there are points in the reversing movement of the car seat where the resistance to turning effect is greater than at other points, this being due at least in part to the relative location and configuration of the cam elements and the rotational momentum of the car seat especially when the seat is swung rapidly.

In practice, car seats are turned by pulling or pushing on the back or arm-rest of the seat at the end thereof. The turning couple consists of the force thus applied and the reactionary force of the fulcrum or pivot of the mechanism. In reversing mechanisms of the type described, the fulcrum shifts during the reversing movement. It is desirable that such shifts be gradual or by small steps so as to promote smoothness of motion in reversing movements of the seat.

According to the present invention, the seat carriage is guided in its reversing movements by mechanism which includes a rack and pinion arranged to mesh during at least a substantial portion of each reversing movement. As the pinion rolls along the rack, the successive teeth act as pivots for the seat carriage and thus result in a gradual shifting of the turning axis.

For a more complete understanding of the invention, reference may be had to the following description of certain embodiments thereof, and to the drawings of which:

Figure 1 is an end elevation of a car-seat structure embodying the invention.

Figure 2 is a plan view of a portion of a vehicle showing car seats mounted in the usual manner.

Figure 3 is a section on the line 3—3 of Figure 2, on a larger scale.

Figure 4 is a section on the line 4—4 of Figure 2, on a larger scale.

Figure 5 is a section on the line 5—5 of Figure 2, on a larger scale.

Figure 8 is a fragmentary plan view of a modified form of the invention.

Figure 9 is a section on the line 9—9 of Figure 8.

Figure 6:
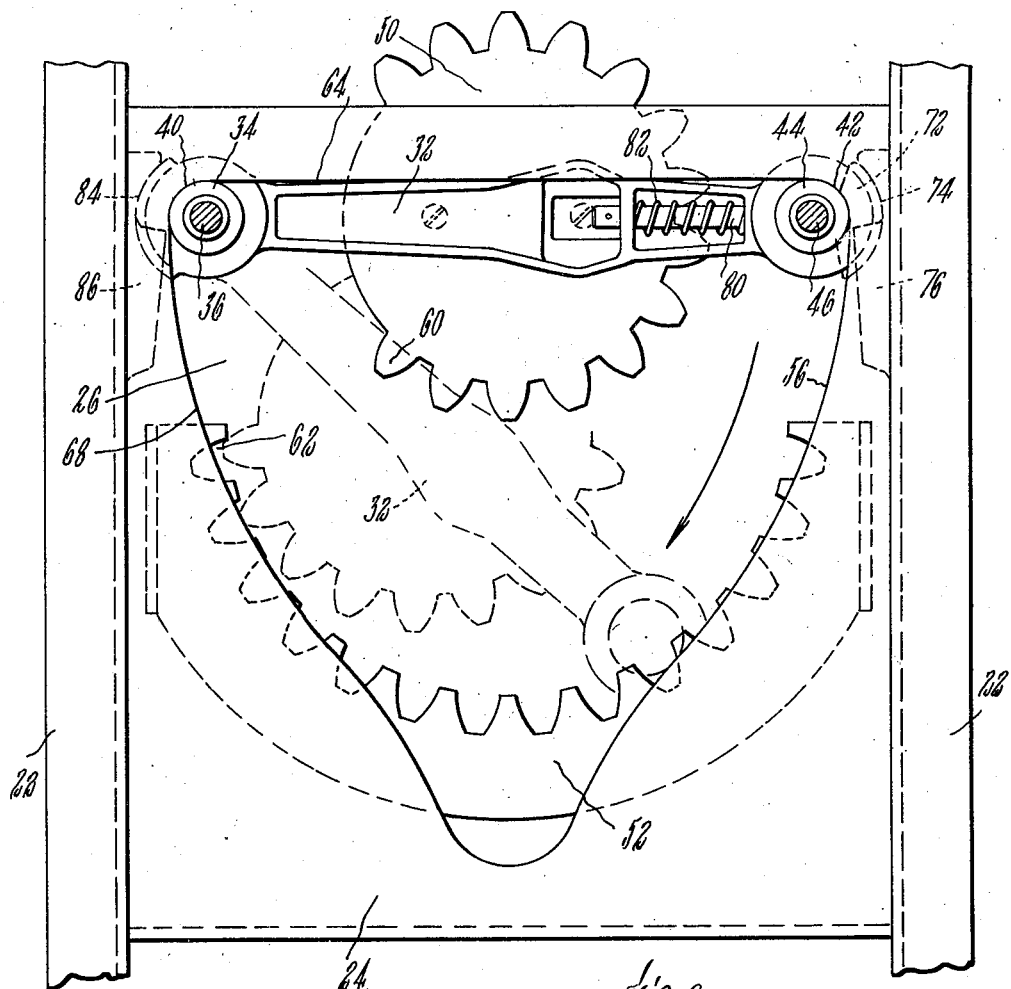
Figure 6 is a section on the line 6—6 of Figure 3.

In mounting car seats in a vehicle such as a railroad coach, it is desirable that the seats be located as close to the wall of the vehicle as possible so as to provide maximum aisle space. When seats are thus mounted, as indicated in Figure 2, it is necessary to shift the seat transversely away from the vehicle wall during the initial portion of any rotating movement of the seat to avoid interference between a corner of the seat and the vehicle wall as the seat rotates about a vertical axis. A considerable number of guide mechanisms have heretofore been produced to accomplish such shifting movement by causing lateral displacement of the seat during each reversing movement thereof; but these mechanisms are in general characterized by a tendency to resist rotating movement of the seat unevenly, that is, to permit easy rotation of the seat through parts of a reversing movement but to oppose rotating movement more or less strongly at certain points. The present invention largely obviates this objection by the use of a pinion or gear wheel which is adapted to mesh with a concave arcuate rack.

In addition to the sidewise movement of the seat to clear the wall during the initial and final stages of each reversing movement, it is also often desirable that the seat have a forward movement, so that when two seats are back to back, the backs will clear each other during the initial portion of the reversing movement of either of the seats. According to the invention, a forward or rearward component of movement can be provided by means of racks and gears of suitable size and shape as hereinafter exemplified.

Figure 1 is an end view of a conventional double car seat 10 having backs 12 and arm-rests 14. The seat is mounted on a carriage 16 which is slidably supported on the top of a suitable stationary pedestal 20. The car seats illustrated on the drawings are the customary double seats but it is evident that the invention is applicable to single seats as well.

The stationary pedestal may include a pair of parallel rails 22 consisting of angle irons which extend transversely of the seat. Between these rails and flush therewith is a horizontal plate 24 on which the carriage 16 is slidably supported. In the plate 24 is an opening 26, shown in Figure 6, the edges of this opening serving as cam surfaces as hereinafter described. Secured to the seat frame, which is a part of the carriage, is a bar 32 which is disposed within the opening 26 below the level of the top plate 24. Mounted on the bar 32 is a pivot element and cam follower consisting of a roller 34 rotatably mounted on a stud or bolt 36 which is secured to the bar 32 near one end thereof. The roller 34 normally engages in one of two sockets 40 and 42 which are corners of the opening 26 in the top plate 24. When the pivot roller 34 is seated in the socket 40, a similar cam follower 44 on the stud 46 is seated in the socket 42, the center points of the elements 34 and 44 being disposed in the longitudinal median of the car seat.

Figure 7:
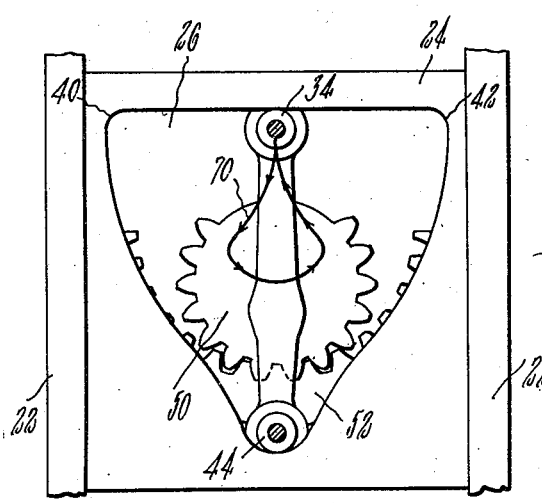
Figure 7 is another view of the mechanism shown in Figure 6, on a smaller scale, the movable parts being shown in a different position of operation.

Mounted beneath the mid-portion of the bar 32 in a horizontal plane is a pinion or gear wheel 50. As shown, the gear wheel may be concentric with the mid-point of the seat. To cooperate with the gear wheel 50 is a concave arcuate rack 52, this rack being mounted within the pedestal 20 below the top plate 24 so as to be in the same plane as the gear wheel 50. The rack 52 is transversely offset from the longitudinal median of the car seat when the latter is in either position of use, and at such times the gear wheel and rack are not in mesh. When it is desired to rotate the car seat from one position of use to the other, the seat and the seat carriage are rotated about the axis of the pivot element 34 during the initial part of the reversing movement, the roller 44 leaving the socket 42 and traveling along the cam edge 56 to maintain the pivot element 34 in its socket during such movement. Since the pivot is longitudinally offset from the center point of the seat, the latter moves away from the vehicle wall in an arcuate path during the initial portion of the reversing movement. This continues until a tooth 60 of the gear wheel 50 enters a recess 62 in the rack 52. The gear wheel thereupon is in meshed engagement with the rack and continues in such engagement during the intermediate portion of the reversing movement of the seat. As the gear wheel 50 rolls along the rack 52, it is held in mesh therewith by the pivot element 34 which travels along the cam edge 64 and in so doing shifts from the socket 40 to the socket 42. When the pivot element 34 reaches the socket 42, the gear wheel 50 is ready to leave the rack 52. The final portion of the reversing movement of the seat thus consists in rotative movement around the axis of the pivot element 34 as it is seated in the socket 42, such movement causing the gear wheel 50 to move away from the rack 52 to its final position which is the reverse of that shown in Figure 6. During such final portion of the reversing movement, the pivot element 34 is maintained in the socket 42 by the cam follower 44 which travels along a cam surface 68 on the pedestal top 24. In Figure 7 the path of travel of the center point of the seat is indicated by a line 70 with arrow heads. This path is pear-shaped and is free from abrupt changes in direction, this being an index of the smoothness of movement of the car seat and carriage. The line 70 also indicates a rapid movement of the seat away from the vehicle wall during the initial part of the reversing movement, this movement away from the wall serving to clear the corner of the seat from contact with the wall. There is also a forward movement of the seat during such initial portion of the reversing movement, this being advantageous in helping to prevent interference between the backs of the reversing seats and the backs of adjacent seats in the vehicle. Thus the seats can be mounted more closely together and more seats can be put in a coach of given length.

Suitable mechanism is provided for releasably holding the seat in either of its positions for use. As shown, the bar 32 is provided at one end with a fan-shaped end element 72 which is adapted to fit into a recess 74 in a fitting 76 which is secured to one of the rails 22 of the pedestal. The element 72 is mounted on the end of a plunger 80 which is axially slidable in the bar 32 and is pressed by a suitable spring 82 to push the end element 72 yieldingly against the fitting 76. When the end of the seat is pulled or pushed to start the reversing movement, the end element 72 rides out of the recess 74 against the pressure of the spring 82. After this initial resistance is overcome, the seat swings easily until it reaches its other position of use, whereupon further rotation of the seat is stopped by the engagement of the element 44 in the socket 40. When the element 44 enters the socket 40, the end element 72 snaps into a recess 84 in a fitting 86 which is similar to the fitting 76. Thus the seat is releasably held in each of its positions for use.

A modified form of reversing mechanism is shown in Figures 8 and 9, this mechanism including a stationary pedestal having a pair of angle irons 100 as rails between which is a horizontal platform 102 set flush with the upper surface of the rails. The platform 102 has therein an opening 104, the edges of which serve as cam surfaces to guide a pair of cam followers 34 and 44 as hereinafter described. Also mounted on the pedestal is a concave arcuate rack 106, this rack being preferably below the platform 102 as indicated in Figure 9. As shown, the rack is semi-circular, the center of curvature of the pitch circle of the rack being the center of the seat carriage when the latter is in either position for use.

The seat carriage is partially indicated by a pair of horizontal frame members 110 which normally rest on the angle irons 100. These frame members are secured by welding or otherwise to a pair of oval supporting plates 112 to which is secured a spacing bar 32 by means of a pair of stud bolts 36 and 46 which are concentric with the cam followers 34 and 44 respectively. Rigidly secured to the under side of the bar 32 is a pinion 116, this pinion being half the diameter of the rack 106, that is to say, the pitch circle of the pinion 116 has a diameter half that of the pitch circle of the rack 106. The pinion 116 is so arranged with respect to the bar 32 that its center is on the longitudinal median of the seat carriage and the center point of the seat carriage is on the pitch circle of the pinion. The cam edges about the aperture 104 are shaped so as to cooperate with the cam followers 34 and 44 to maintain the pinion 116 in mesh with the rack 106. When the seat is in either position of use, the cam followers 34 and 44 engage in corners or sockets 120 in the cam surfaces. During the first half of a reversing movement, the cam follower 44 travels along a curved cam surface 122 as the pinion 116 moves along the rack 106. During the last half of the reversing movement, the cam follower 44 moves along a curved cam surface 124 which is symmetrical to the surface 122 with respect to the transverse median of the pedestal. During the reversing movement of the seat, the cam follower 34 moves along a straight cam surface 126, the movements of the cam followers 34 and 44 resulting in an exchange of positions of these cam followers. The engagement of the cam followers 34 and 44 with the cam surfaces 126, 122 and 124, maintains the pinion 116 in mesh with the rack 106 during the entire reversing movement. Since the pitch diameter of the pinion is just half of the pitch diameter of the rack, the center point 130 of the seat which is on the pitch circle of the pinion describes a hypocycloid which is in the form of a straight line coinciding with the transverse median of the pedestal. This means that during the first half of a reversing movement the center point of the seat moves directly away from the vehicle wall in a straight path, the rate of such movement being at a maximum at the beginning of the reversal of the seat and decreasing to zero when half of the reversing movement has been completed. During the last half of the reversing movement, the center point of the seat moves back toward the wall at an increasing speed until it reaches its original position when the reversing movement is completed, the foregoing rates of movement of the center point of the seat being predicated on a constant angular speed of rotation of the seat during a reversing movement.

Figure 10:
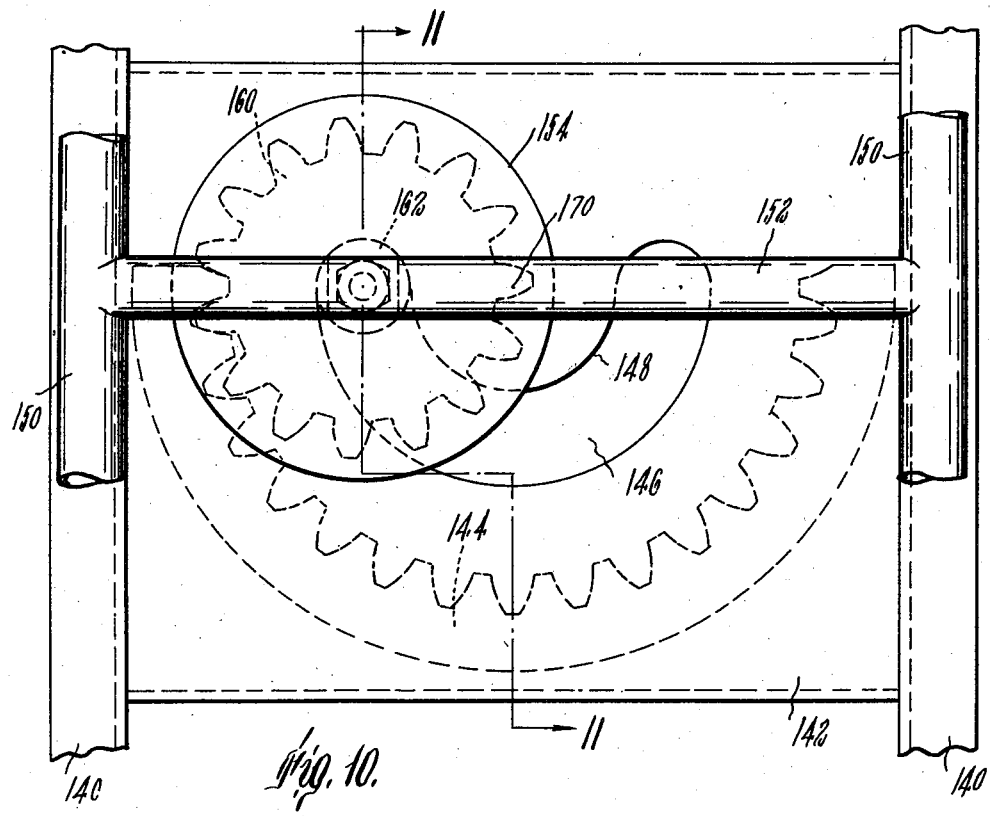
Figure 10 is a fragmentary plan view of another modified form of the invention.
Figure 11:
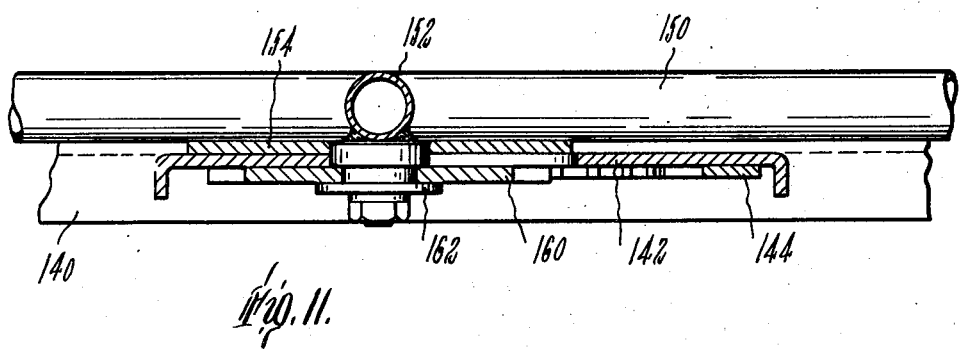
Figure 11 is a section on the line 11—11 of Figure 10.
Figure 12:
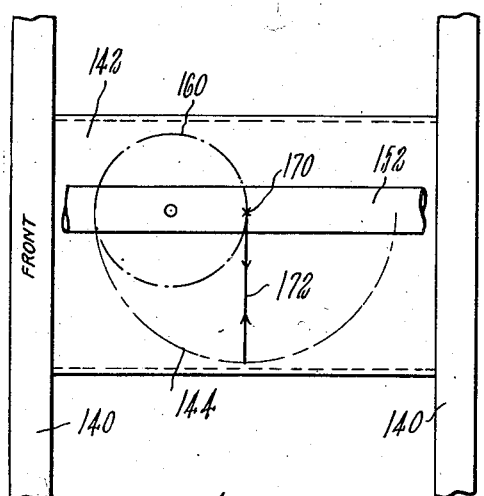
Figure 12 is a simple diagrammatic representation of the pitch contours of the racks and gears illustrated in Figures 8 and 10, and of the path followed by the center of the seat during a reversing movement.

Figures 10 and 11 illustrate another modified form of the invention. A stationary pedestal is shown including a pair of rails 140 between which is secured a platform 142, the top surface of this platform being slightly below the top surfaces of the rails 140 as indicated in Figure 11. Mounted on the pedestal beneath the platform 142 is a concave semi-circular rack 144 the center of which is at the center of the pedestal. The platform 142 is provided with an opening 146 having a semi-circular convex cam surface 148 which is concentric with the rack 144. The seat carriage is represented in Figure 10 by a pair of frame members 150 connected by a central longitudinal frame member 152. Secured to the latter is a circular bearing plate 154 which rests on the top surface of the platform 142 so as to carry the seat carriage during reversing movements thereof. Concentric with the circular plate 154 is a pinion 160 which is fixed on the transverse frame member 152, the center of the pinion being on the longitudinal median of the seat carriage. Also concentric with the plate 154 and pinion 160 is a cam follower 162 which is preferably rotatable and which bears against the convex cam surface 148 so as to maintain the pinion 160 in mesh with the rack 144. The pitch diameter of the pinion 160 is one-half the pitch diameter of the rack 144. The center point 170 of the seat is directly above a point on the pitch circle of the pinion 160, so that when the pinion moves on the rack 144, the point 170 describes a hypocycloid 172 which, as indicated in Figure 12, is a straight line coinciding with the transverse median of the pedestal. Thus the seat during the first half of any reversing movement moves away from the vehicle wall, the center point of the seat moving in a straight line parallel to the pedestal rails 140. During the last half of any reversing movement the center point of the seat moves back toward the vehicle wall until it reaches its original position when the reversing movement is completed.

Figure 13:
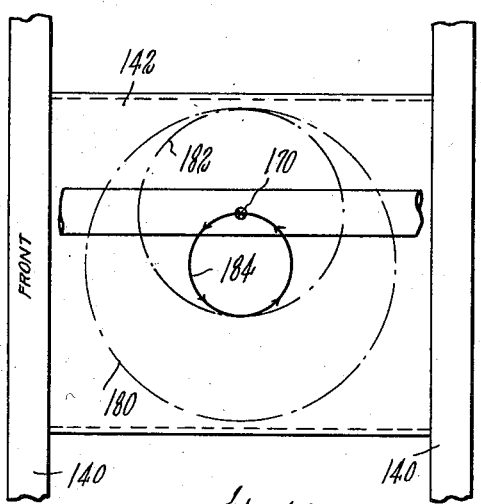
Figures 13 to 16 are similar diagrammatic representations of various modified forms of rack and gears.

Figures 13 to 16 represent diagrammatically a few of the many variations of forms the rack and pinion structure for reversing car-seat bases may take, the paths of movement of the center point of the seat being indicated in each case. In Figure 13 the rack 180 is a complete circle within which rolls a pinion 182 having a pitch diameter two-thirds that of the rack. The center 170 of the seat is over the center of the pinion. Hence the path described by the center 170 is a circle 184. This movement is useful in certain special cases, but is not desirable for the ordinary car seat as the initial shifting movement is along the wall rather than away from it.

Figure 14:
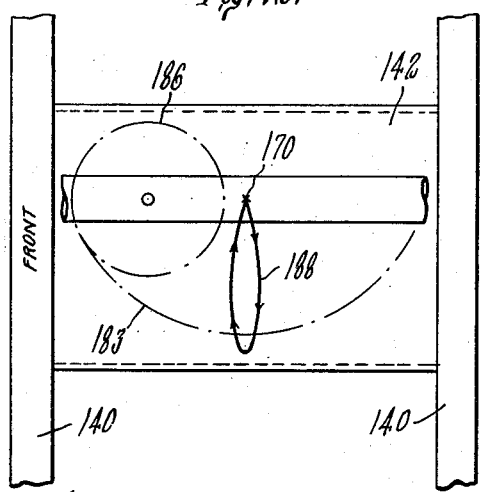

In the mechanism indicated in Figure 14 the pinion 186 rolls on a rack 188 which is 120° of a circle. As is evident from the curve 188, the initial shifting movement of the seat is rapidly away from the wall, with a small rearward component.

Figure 15:
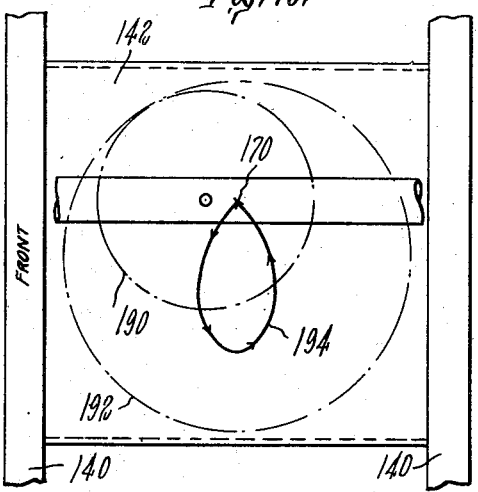

In Figure 15 a pinion 190 rolls within a circular rack 192 but is offset from the center so that only five-sixths or 300° of the rack is traversed. The ratio of diameters of the pinion and rack is five to eight. During initial reversing movements, the seat has an outward shift away from the wall, the shifting movement having also a decided forward component, as indicated by the curve 194, which is particularly advantageous in the case of seats having backs adjustable to various angles of inclination.

Figure 16:
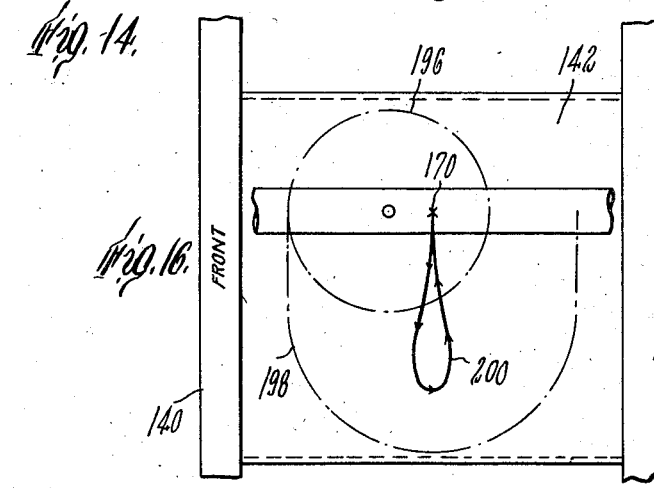

Figure 16 illustrates a pinion 196 rolling on a rack 198 which is in the form of a semicircle having straight extensions at the ends, the total length of the pitch contour of the rack being equal to the circumference of the pitch circle of the pinion. As indicated by the curve 200, the seat center 170 moves rapidly away from the wall during initial portions of reversing movements, the shifting movement having a relatively small forward component.

In the foregoing discussion of reversing movements it is assumed that the seat itself is mounted on the seat carriage to face in the direction indicated by the legend "Front" in Figures 12 to 16. A seat so mounted faces the vehicle wall during the mid-portion of each reversing movement. The seats could be mounted on the carriages to face in the opposite direction, in which case they would face the aisle during reversals and the forward and rearward components of shifting movements would be just the opposite to those hereinbefore described, but it is customary practice to mount the seats on the carriages as indicated on the drawings.

It is evident that various modifications and changes may be made in the embodiments of the invention herein shown and described without departing from the spirit or scope thereof as defined in the following claims.

I claim:

1. A car-seat base comprising a stationary pedestal, a seat carriage slidable and reversible thereon, and means for guiding reversing movements of said carriage on said pedestal, said means including a pivot element on said carriage longitudinally offset from the center point thereof, a socket on said pedestal in temporary engagement with said pivot element during the initial portion of a reversing movement, a concave arcuate rack mounted on said pedestal in a horizontal plane, a gear wheel carried by said carriage and movable into meshing engagement with said rack by rotation of said carriage about its pivot, means including said pivot and a cam surface on said pedestal for maintaining said gear wheel and rack in mesh during the intermediate portion of a reversing movement of the seat, and a second socket on said pedestal adapted to receive said pivot element for the final portion of the reversing movement of the seat.

2. A car-seat base comprising a stationary pedestal, a seat carriage slidable and reversible thereon, and means for guiding reversing movements of said carriage on said pedestal, said means including a gear wheel normally disposed in a horizontal plane and concentric with the center-point of the seat, a concave arcuate rack mounted on said pedestal and transversely offset from the horizontal median of the seat so as to be out of mesh with said pinion when the seat is in either of its normal positions for use, means for causing transverse shifting movement of the seat carriage during the initial portion of its reversing movement to bring said gear wheel into mesh with said rack for the intermediate portion of said reversing movement, and means for causing shifting movement of the seat carriage during the final portion of its reversing movement to bring said gear wheel away from said rack to position on the longitudinal median of the seat.

3. A car-seat base comprising a stationary pedestal, a seat carriage slidable and reversible thereon, and means for guiding reversing movements of said carriage, said means including a gear wheel mounted on said carriage in a horizontal plane and concentric with the center-point of the seat, a pivot element mounted on the carriage and longitudinally offset from the center-point thereof, a pair of sockets on said pedestal one of which is operatively engaged by said pivot element during the initial portion of a reversing movement, the other socket being engaged by said pivot element during the final portion of a reversing movement, an arcuate rack engaged by said gear wheel during the intermediate portion of a reversing movement while said pivot element shifts from one side socket to the other, cam means on said carriage and pedestal for maintaining said pivot element in said sockets during the initial and final portions respectively of a reversing movement, and a cam surface on said pedestal engaged by said pivot element during its movement from one socket to another to maintain said gear wheel in mesh with said rack during the intermediate portion of a reversing movement.

4. A car-seat base comprising a stationary pedestal, a seat carriage slidable and reversible thereon, and means for guiding reversing movements of the carriage on the pedestal, said guiding means including cam and follower means effective during the reversing movement of the carriage to confine such movement to rotation successively about stationary axes offset from the center-point of the seat respectively during the initial and final portions of said movement, said guiding means also including a rack and pinion device having members mounted on said pedestal and carriage respectively and interengageable to assist in guiding the carriage during an intermediate portion of said reversing movement.

5. A car-seat base comprising a stationary pedestal having an opening forming a cam edge in the top thereof, a seat carriage slidable and reversible on said top, and means for guiding the reversing movements of said carriage, said guiding means including a pair of spaced cam followers mounted on said carriage and projecting into said opening to engage and travel along said cam edge at opposite sides of said opening, a rack mounted on said pedestal in a plane parallel with said top, and a pinion secured to said carriage and movable therewith in the plane of said rack, said rack and pinion being arranged to maintain one of said followers in contact with said cam edge and to be kept in mesh by said one follower during a portion of each reversing movement of the carriage.

OIVA E. HILL.